United States Patent

Nishida et al.

Patent Number: 5,540,398
Date of Patent: Jul. 30, 1996

[54] MAGNETIC TAPE TENSION CONTROL DEVICE

[75] Inventors: Masafumi Nishida, Ibaraki; Osamu Yamaguchi, Katano; Souichirou Fujioka, Sakai; Hiroshi Okamoto, Nara; Yoshiho Gotoh, Osaka, all of Japan

[73] Assignee: Matsushita Electric Industrial Co., Ltd., Osaka, Japan

[21] Appl. No.: 375,223

[22] Filed: Jan. 19, 1995

Related U.S. Application Data

[63] Continuation of Ser. No. 917,347, Jul. 23, 1992, abandoned.

[30] Foreign Application Priority Data

| Jul. 24, 1991 | [JP] | Japan | 3-184475 |
| Sep. 10, 1991 | [JP] | Japan | 3-230148 |
| Dec. 12, 1991 | [JP] | Japan | 3-328566 |

[51] Int. Cl.6 ............... B65H 59/38; G11B 15/46; G11B 23/42
[52] U.S. Cl. ............... 242/334.2; 242/334.5; 242/334.6; 360/71
[58] Field of Search ............... 242/190, 191, 242/186, 75.51, 75.52, 334.2, 334.5, 334.6; 318/7; 360/71

[56] References Cited

U.S. PATENT DOCUMENTS

| 4,015,799 | 4/1977 | Koski et al. | 242/334.4 |
| 4,398,227 | 8/1983 | Anderson | 242/334.3 X |
| 4,461,433 | 7/1984 | Kani | 242/412.3 |
| 4,525,654 | 6/1985 | Tajima et al. | 318/7 |
| 5,039,027 | 8/1991 | Yanagihara et al. | 242/334.2 |
| 5,222,684 | 6/1993 | Yoneda et al. | 242/334.2 |

FOREIGN PATENT DOCUMENTS

| 2503911 | 10/1982 | France . |
| 3229780 | 2/1984 | Germany . |

OTHER PUBLICATIONS

Patent Abstract of Japan, vol. 14, No. 352 (P-1085) 30 Jul. 1990 & JP-A-02 126 455 (Hitachi Ltd) 15 May 1990.

*Primary Examiner*—John Q. Nguyen
*Attorney, Agent, or Firm*—Wenderoth, Lind & Ponack

[57] ABSTRACT

A torque command is applied to a tape running unit. The tape running unit for draws out and drives a tape wound on a first reel and taken up on a second reel. The torque command is modulated by a torque modulator in accordance with a moment of inertia of the first reel, a winding radius of the tape wound on the first reel, a moment of inertia of the second reel and a rotating radius of the second reel, which are detected by a parameter detector. The first motor is responsive to the modulated torque command for rotating the first reel, thereby keeping the tension of the tape constant.

1 Claim, 6 Drawing Sheets

MAGNETIC TAPE TENSION CONTROL DEVICE

This application is a continuation of now abandoned application Ser. No. 07/917,347, filed Jul. 23, 1992.

BACKGROUND OF THE INVENTION

1. Field of the Invention

The present invention relates to a magnetic tape tension control device in a tape running system of a video tape recorder (VTR) or the like.

2. Description of the Prior Art

In the case of an apparatus which draws out a magnetic tape (hereinafter referred to as a tape) from a supply reel for recording and reproducing signals, such as In the VTR, it is necessary to keep constant the tension of the drawn-out tape constant in order to stably magnetically record and reproduce signals while maintaining a constant contact state between the tape and the magnetic head. Keeping the tape tension constant is also necessary from the viewpoint of decreasing damage of the tape.

In order to stabilize the tape tension, hitherto, it has been attempted to detect the tension of the drawn-out tape, feed the detected tension, and control the torque of a first motor for directly driving the supply reel on which the tape is wound, thereby stabilizing the tension of the tape (for example. See "Collection of Technical Papers of Modern VTR Design Technologies," edited by the Japan Industrial Technology Center).

In such a conventional configuration, there is a limit in enhancing the response of the feedback system Including the first motor to cause the supply reel to follow the motion of the takeup reel or the capstan responsible for speed control of the tape. In particular, If the response of the capstan or the takeup reel to a tape speed command is increased in order to improve controllability, the tape becomes too tense or too loose.

SUMMARY OF THE INVENTION

It is hence a primary object of the invention to present an excellent tension control apparatus which is free of overtension or tape sag even if the tape speed is changed quickly as a result of a sudden change in the torque of the motor for driving the capstan or takeup reel.

To achieve the above object, the invention presents a tension control apparatus comprising: a first reel on which a tape is wound; a first motor for directly driving the first reel; tape running means for drawing out the tape from the first reel and running the tape at a specific speed; a second motor for directly driving the tape running means; a first driving circuit for generating a torque proportional to an input signal in the first motor; a second driving circuit for generating a torque proportional to an externally supplied torque command in the second motor; a parameter detector for detecting a moment of inertia of the first reel about a rotary shaft of the first motor, a winding radius of the tape wound on the first reel, a moment of inertia of the tape running means about a rotary shaft of the second motor, and a rotating radius of the tape running means; and a torque modulator for modulating the externally supplied torque command according to a detection output of the parameter detector, an output of the torque modulator being used as the input signal of the first driving circuit.

In this configuration, even if the tape speed is changed quickly as the result of a sudden change in the torque command of the second motor for driving the tape running means, the follow-up performance of the first reel is excellent, so that overtension or tape sag hardly occurs. Therefore, it is possible to compose an apparatus which has superb controllability with a quick response to the tape speed command, and is from a practical standpoint very useful.

In addition to the above configuration, the apparatus may further comprise tension detecting means for detecting a tension of the tape at a specific position on a tape running path from the first reel to the tape running means, and a first synthesizer for summing an output of the tension detecting means and the output of the torque modulator at a specific gain, an output of the first synthesizer being used as the input signal of the first driving circuit.

The thus composed apparatus has a damping property, which causes convergence of operation errors of the parameter detector and various disturbances, so that the tension fluctuations can be further suppressed. Further, the resonance due to mutual interference of the two reels, which are coupled through the tape, can be suppressed at the same time.

The tension detecting means and the first synthesizer may be replaced by a speed detector for detecting a rotating speed of the first motor, and a second synthesizer for summing up an output of the speed detector and the output of the torque modulator at a specific gain, an output of the second synthesizer being used as the input signal of the first driving circuit.

In order to improve-stability of the control system, the detection signal of the tension detecting means must be differentiated when fed back to the motor. Thus, the tension control band, which should be widened, is restricted due to effects of noise components or the like. However, in the last mentioned configuration, since the stability of the control system is guaranteed by detecting the rotating speed of the first motor for directly driving the first reel and feeding it back to the motor, it is easier to broaden the control band of the tension control system. It is also possible to omit the tension detector.

DESCRIPTION OF THE PREFERRED EMBODIMENTS

Figure 1:
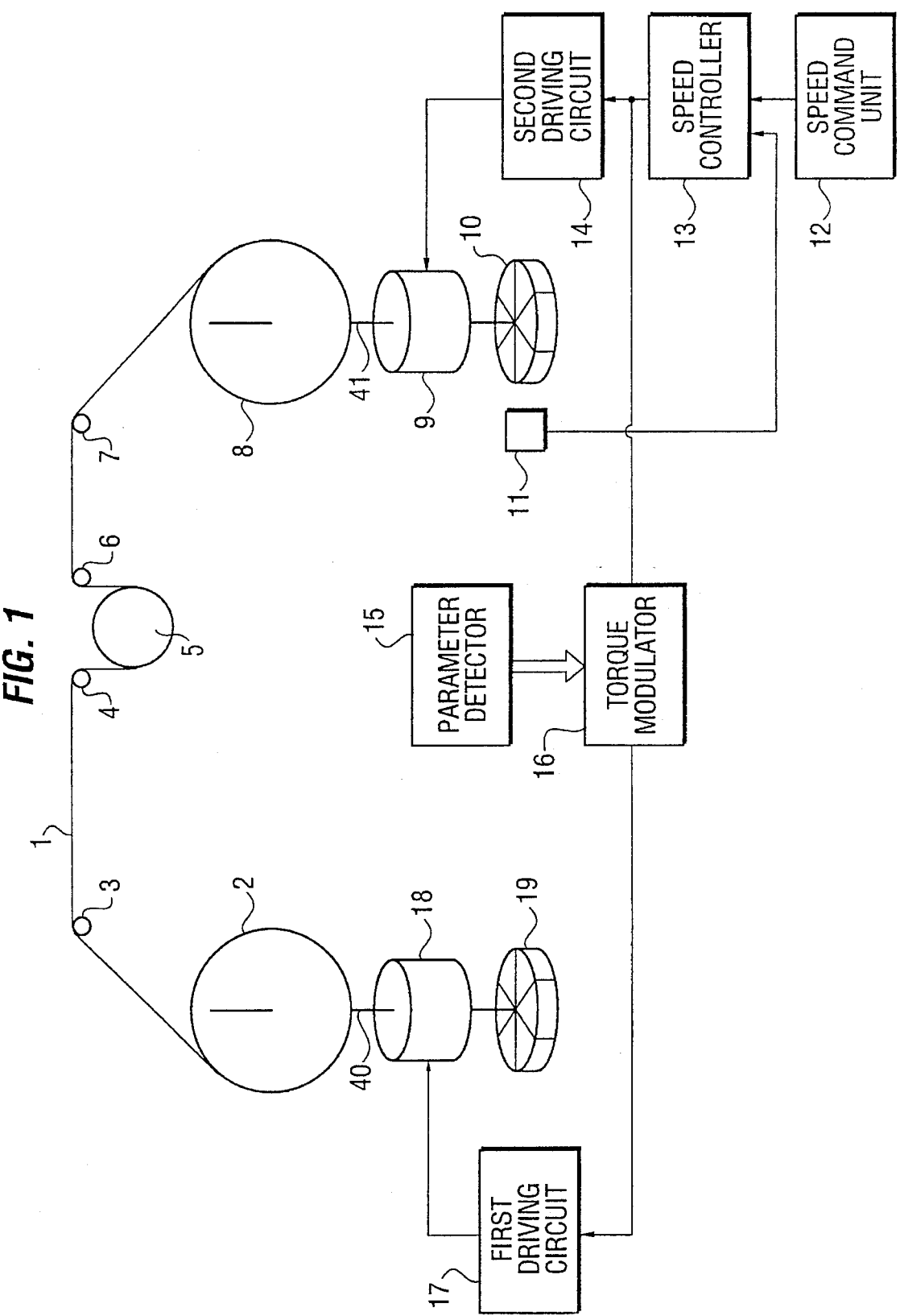
FIG. 1 is a structural diagram of a tension control apparatus in a first embodiment of the invention.

Referring now to the drawings, some of the preferred embodiments of the tension control apparatus of the invention are described in detail below. FIG. 1 is a structural diagram of a tension control apparatus in a first embodiment of the invention. The explanation of this embodiment is with respect to a reel-to-reel mode in which the tape running means comprises the takeup reel and the tape is transferred by two reels. A tape 1 is drawn out of a supply reel 2, and is obliquely wound on a rotary drum 5 through posts 3, 4, and is taken up on a takeup reel 8 through posts 6, 7. A magnetic head is mounted on the rotary drum 5, and the tape 1 is recorded or reproduced by the known helical scan.

The tape speed is controlled by the takeup reel 8. The takeup reel 8 is directly coupled to a second motor 9 to be rotationally driven. A magnet 10 magnetized in multiple poles is mounted on the rotary shaft of the second motor 9, and the magnet 10 rotates with the rotation of the second motor 9, and a magnetic flux detecting element 11 confronting the magnet 10 generates a pulse at a frequency proportional to the rotating speed. A speed command unit 12 issues a rotating speed command value for the second motor 9 depending on an externally set tape speed. A speed controller 13 detects the rotating speed of the second motor 9 from the output pulse of the magnetic flux detecting element 11, and varies the torque command of the second motor 9 so that the rotating speed command value of the speed command unit 12 and the rotating speed of the second motor 9 may coincide with each other. A second driving circuit 14 supplies electric power to the second motor 9 depending on the output of the speed controller 13. As a result, the tape speed is controlled by the speed command unit 12.

The tension of the tape 1 is controlled by the supply reel 2. In the invention, in order to sufficiently suppress the tension fluctuations even during acceleration or deceleration of the tape, the same acceleration or deceleration as the acceleration or deceleration of the tape 1 by the takeup reel 8 is given to the supply reel 2 side, so that the tension is kept constant. This constitution is explained below. The parameter detector 15 detects the values of the radii rs, rt of the portions of the supply reel 2 and takeup reel 8 on which the tape is wound (hereinafter called winding radii), continuously changing as the tape runs, and the values of the moment of inertia Js of the supply reel about the rotary shaft 40 of the first motor 18 and the moment of inertia Jt of the takeup reel 8 about the rotary shaft 41 of the second motor 9. The subscripts s, t denote the parameters of supply reel 2 and takeup reel 8, respectively. The torque modulator 16 calculates the torque necessary for the first motor 18 from the torque command of the second motor 9 produced by the speed controller 13, depending on the output of the parameter detector 15.

Supposing the tension of the tape 1 around the takeup reel 8 to be Ft and the back tension of the tape 1 near the supply reel 2 to be Fs, then Ft= U·Fs, where U is the tension factor from the takeup reel 8 to the supply reel 2 determined by the mechanism. Supposing the moving speed of the tape 1 to be V, the torque of the second motor 9 to be Tt and the torque of the first motor 18 to be Ts, since the winding radius rt of the takeup reel 8 and the winding radius rs of the supply reel 2 vary smoothly, Tt and Ts are approximately expressed as in equations (1), (2) from the motion equation of the reels 8, 2.

$$Jt \frac{\dot{V}}{rt} = Tt - Ft \cdot rt \tag{1}$$

$$Js \frac{\dot{V}}{rs} = Ts + Fs \cdot rs \tag{2}$$

where the dot placed over a character denotes the differential value with respect to the time.

From equations (1), (2), removing the differential of V, the torque Ts of the first motor 18 of the supply reel 2 for equalizing the acceleration or deceleration of the tape 1 transferred by two reels 2, 8 is expressed as in equation (3).

$$Ts = \frac{Js \cdot rt}{Jt \cdot rs} (Tt - Ft \cdot rt) - fS \cdot RS \tag{3}$$

Accordingly, the value of the tension factor U is properly determined depending on the mechanism, and Fs, Ft are selected to the tension target values of the supply reel 2 and takeup reel 8. In the torque modulator 16, using the detection value of the parameter detector, from the torque command of the second motor 9, the torque Ts of the first motor 18 is calculated by, for example, a microcomputer or the like according to equation (3), and is delivered to a first driving circuit 17. The first driving circuit 17 supplies electric power to the first motor 18 depending on the output of the torque modulator 16.

Thus, by calculating the torque necessary for the first motor 18 from the torque command of the second motor 9 and driving the first motor 18 by a feed-forward operation, the supply reel 2 is put in action without time delay depending on the operation of the takeup reel 8. As a result, even in the case of sudden acceleration or deceleration of the tape speed, the tension fluctuations may be sufficiently suppressed.

Figure 2:
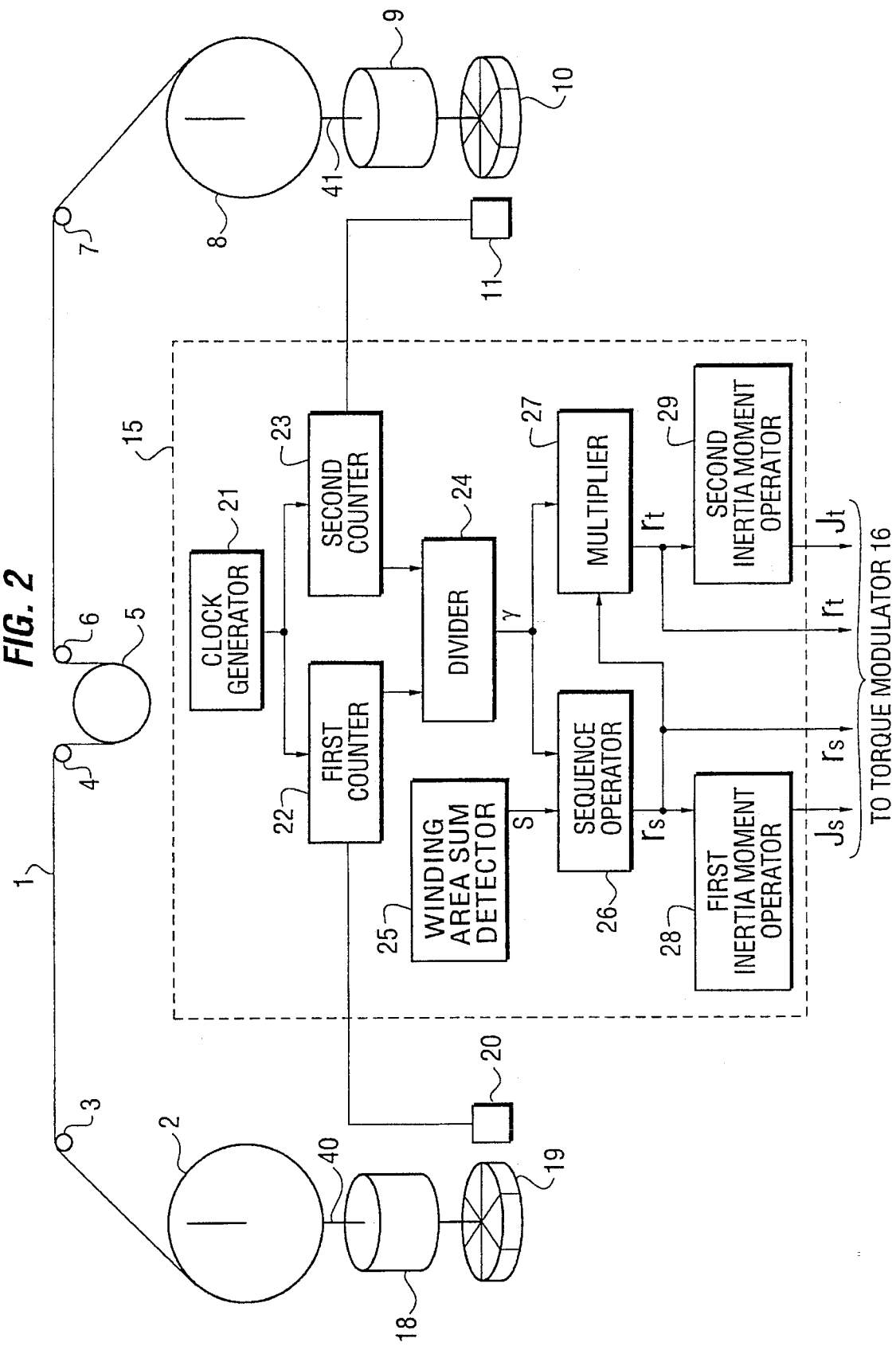
FIG. 2 is a structural diagram of a parameter detector in an embodiment in which the tape running means of the invention is the takeup reel.

An embodiment of parameter detector 15 is explained by reference to FIG. 2. Magnets 10, 19 magnetized in multiple poles are mounted on rotary shafts 40 and 41 of the first motor 9 and second motor 18. The magnets 10, 19 are magnetized in the same number of poles. The magnets 10, 19 rotate together with the rotations of the first motor 9 and second motor 18, and the magnetic flux detecting elements 11 and 20 confronting the magnets 10 and 19, respectively, generate pulses at a frequency proportional to the rotating speed of the first reel 2 and second reel 8. A clock generator 21 generates pulses in specific period Tc, and delivers the same to a first counter 22 and a second counter 23. The first counter 22 counts the number of pulses (Ns) entered from the magnetic flux detection element 20 in a specific period Tc. Likewise, the second counter 23 counts the number of pulses (Nt) entered from the magnetic flux detection element 11 within the specific period Tc. A divider 24 determines the ratio γ of the outputs of the first counter 22 and second counter 23.

$$\gamma = \frac{Ns}{Nt} \tag{4}$$

Since the takeup reel 8 and supply reel 2 are coupled together through the tape 1, the winding radius ratio rt/rs is given as the value of γ.

Below is described an embodiment of a winding area sum detector 25 for detecting the sum of the area of a circle of which radius is the winding radius of the tape 1 wound on the supply reel 2, and the area of a circle of which radius is the winding radius of the tape 1 wound on the takeup reel 8 (hereinafter called the winding area sum). The winding area sum is absolutely determined by the tape to be used, and is a fixed value not variable with the tape running. Accordingly, right after loading the tape 1, the tape 1 is run for a specific time by using a capstan and pinch roller, and the winding area sum is detected beforehand.

Pulse generators for generating pulses at the frequency proportional to the rotating speed are disposed on rotary shafts of the capstan, first motor 18 and second motor 9. The pulse generator is composed of, for example, a magnet magnetized in multiple poles mounted on a rotary shaft of a motor, and a magnetic flux detection element confronting the magnet. The number of pulses generated during one revolution of the capstan, takeup reel 8 and supply reel 2 is respectively Zc, Z, Z, and the radius of the rotary shaft of the capstan is rc. After running the tape 1 by using the capstan and pinch roller, the numbers of pulses of the capstan, takeup reel 8 and supply reel 2 generated within a specific period are Nc0, Nt0, Ns0, respectively, the ratio of the numbers of the pulses of the capstan and takeup reel 8 is Mt and the ratio of the numbers of pulses of the capstan and supply reel 2 is Ms, and seeing that they are coupled through the tape 1, it follows that $$Mt = \frac{Nc0}{Nt0} = \frac{rt0 \cdot Zc}{rc \cdot Z} \quad (5)$$

$$Ms = \frac{Nc0}{Ns0} = \frac{rs0 \cdot Zc}{rc \cdot Z} \quad (6)$$

where rt0, rs0 are the winding radius of the takeup reel 8 and winding radius of the supply reel 2 at each moment, and from equations (5), (6), we obtain $$rt0 = \frac{Z}{Zc} \cdot rc \cdot Mt \quad (7)$$

$$rs0 = \frac{Z}{Zc} \cdot rc \cdot Ms \quad (8)$$

Hence, supposing the winding area sum to be S, it may be expressed as in equation (9) by using the winding radii of the takeup reel 8 and supply reel 2 obtained in equations (7) and (8).

$$S = \pi(r_{to}^2 + r_{so}^2) \quad (9)$$

That is, right after loading the tape 1, the tape 1 is run for a specific time by the capstan and pinch roller, and when the pulse number ratio Mt of the capstan and takeup reel 8, and the pulse number ratio Ms of the capstan and supply reel 2 are determined, the winding area sum S is calculated according to equations (7), (8), (9). The winding area sum S is constant if the tape is the same, and It is not necessary to change as long as the tape is the same. If only one type of tape is used, S may be regarded as a constant.

From the winding radius ratio $\gamma$ delivered by the divider 24 and the winding area sum S delivered by the winding area sum detector 25, the winding radius of each of the supply reel 2 and takeup reel 8 may be determined by a sequence operator 26 and a multiplier 27. Since the winding radii of the supply reel 2 and takeup reel 8 are respectively rs, rt, the winding radius ratio $\gamma$ is obtained in equation (10).

$$\gamma = \frac{rt}{rs} \quad (10)$$

The winding area sum S obtained in the following equation by using the winding radii of the supply reel 2 and takeup reel 8.

$$S = \pi(r_t^2 + r_s^2) \quad (11)$$

From the relation of equations (10) and (11), the winding radii of the supply reel 2 and takeup reel 8 are obtained equations (12), (13).

$$rs = \sqrt{\frac{S/\pi}{1 + \gamma^2}} \quad (12)$$

$$rt = \gamma \cdot rs \quad (13)$$

However, as known from equation (12), it is necessary to calculate the square root. In the invention, accordingly, to calculate them, the known Newton-Raphson method is employed. To determine the square root of N (>0), the solution to the equation $$f(x) = x^2 - N = 0 \quad (14)$$

must be determined. By applying the Newton-Raphson method in this calculation, assuming the initial value $x_0 = N$, it is possible to obtain the solution by the repetitive calculation of equation (14).

$$xi + 1 = xi - \frac{f(xi)}{f'(xi)} = \frac{xi^2 + N}{2xi} \quad (15)$$

That is, to calculate equation (12), $$X0 = N = \frac{S/\pi}{1 + \gamma^2} \quad (16)$$

is determined, and by calculating repeatedly by using equation (15), the winding radius of the supply reel 2 is obtained. This operation is guaranteed to be converged always on the solution, and the convergence is very prompt as compared with the generally known successive dividing method or linear inverse interpolation method, and the convergence is achieved in secondary step. In the actual apparatus, the CPU and other devices for performing these operations can be executed in a short processing time.

Accordingly, in the sequence operator 26, from the output $\gamma$ of the divider 24 and the output S of the winding area sum detector 25, the initial value is determined by the calculation expressed in formula (16), the sequence obtained by the progressive formula expressed in equation (15) is calculated, and the value of the element $x_n$ obtained by repetitive calculation of the progressive formula by n times (n being a specific natural number) is delivered. In a multiplier 27, the output $\gamma$ of the divider 24 and the value of the element $x_n$ delivered from the sequence operator 26 are multiplied. At this time, the outputs of the sequence operator 26 and multiplier 27 are the winding radii of the supply reel 2 and takeup reel 8 obtained by respective operations. Here, when a large value is selected for the specific natural number n, a sufficiently converged result is obtained, but a proper value should be selected in consideration of the operation time in the device and required precision in specification.

Furthermore, the winding radius rs of the supply reel 2 obtained in the sequence operator 26 is delivered to a first inertia moment operator 28, and the winding radius rt of the takeup reel 8 obtained in the multiplier 27 is produced to a second inertia moment operator 29, and by calculating equation (17), the moment of inertia J of the reels 1,8 is obtained.

$$J = \frac{\pi \rho H(r^4 - rh^4)}{2} + Jh + Jm \quad (17)$$

where Jh, Jm are moments of inertia of the reel hub and the rotor of the reel motor, and r is the winding radius of the reel detecting the values changing continuously. Also rh is the reel hub radius, $\rho$ is the specific gravity of the tape 1, and H is the width of the tape 1.

It is thus possible to detect the moment of inertia and winding radius of the supply reel 2 about the rotary shaft 40 of the first motor 18, and the moment of inertia and winding radius of the takeup reel 8 about the rotary shaft 41 of the second motor 9. Depending on these values, from the torque command value of the second motor 9, the necessary torque of the first motor 18 may be calculated in the torque modulator 16.

In the invention, therefore, the winding radii of the supply reel 2 and takeup reel 8 can be determined in a short time from the winding radius ratio and winding area sum of the supply reel 2 and takeup reel 8. Hence, the conventionally required memory for the conversion table for determining the winding radii of the two reels 2, 8 from the winding radius ratio is not needed. In particular, when using a tape changing largely in the winding radius, or when using multiple types of tapes differing in tape length, the conversion table is not needed, and the required memory does not increase. In the invention, moreover, the torque of the first motor 18 is calculated according to the winding radius or moment of inertia, and feed-forward driving is effected. Accordingly, it is necessary to determine these parameters, such as the winding radius and moment of inertia, at high precision. In such a case, too, since the winding radius 1s determined by calculation, it is easy to detect the winding radius and moment of inertia changing with the running of the tape at high precision and successively.

Figure 3:
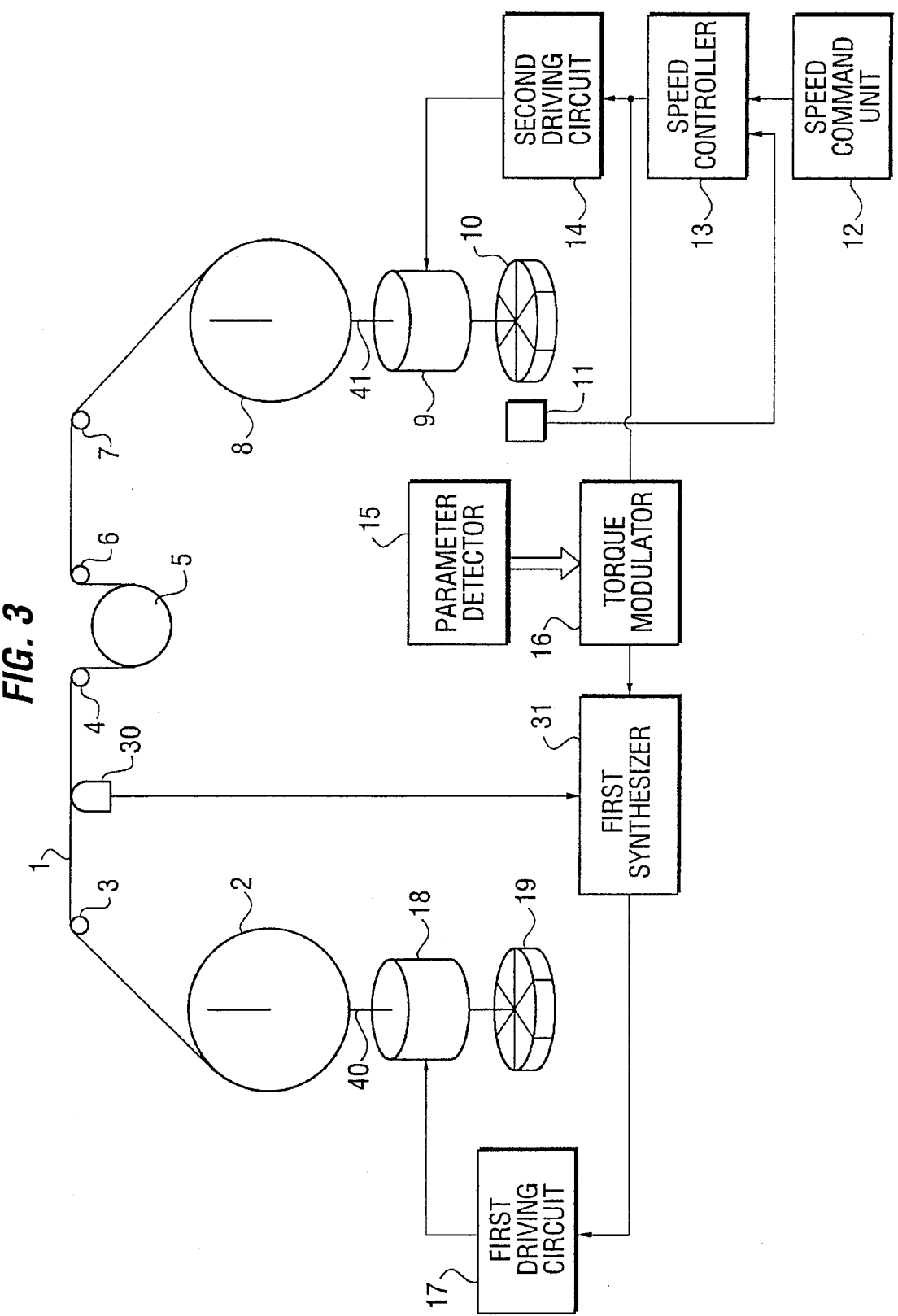
FIG. 3 is a structural diagram of a tension control apparatus in a second embodiment of the invention.

In this configuration, the tension of the tape 1 can be controlled. However, since the first motor 18 is driven by feed-forward, a slight tension variation may occur if a calculation error of torque of the first motor 18 obtained by calculation or some disturbances are present. Accordingly, a second embodiment is shown in FIG. 3. The same constituent elements as in the first embodiment are identified with same reference numbers.

The second embodiment features a pressure sensor 30 for detecting the tension of the tape 1 at a specific position of the running route of the tape 1 from the supply reel 2 to the takeup reel 8. The pressure sensor 30 is pressed with a force proportional to the tension of the tape 1, and an electric signal proportional to this pressing force is produced. That is, from the pressure sensor 30, an electric signal proportional to the tension of the tape 1 is obtained. That is, the first synthesizer 31 synthesizes the output of the pressure sensor 30 and the output of the torque modulator 16, and the output signal of the pressure sensor 30 is differentiated, and is combined with the output of the torque modulator 16. The first driving circuit 17 drives so that the torque proportional to the output of the first synthesizer 31 may be generated in the first motor 18.

Figure 4:
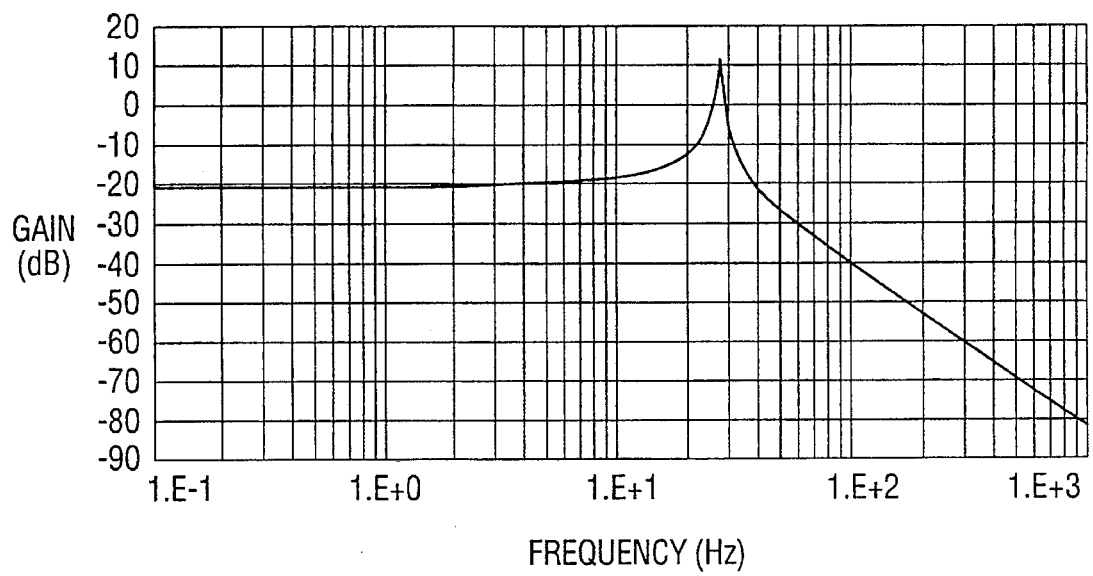
FIG. 4 is a disturbance suppression characteristic diagram of the tension control apparatus in the first embodiment of the invention.
Figure 5:
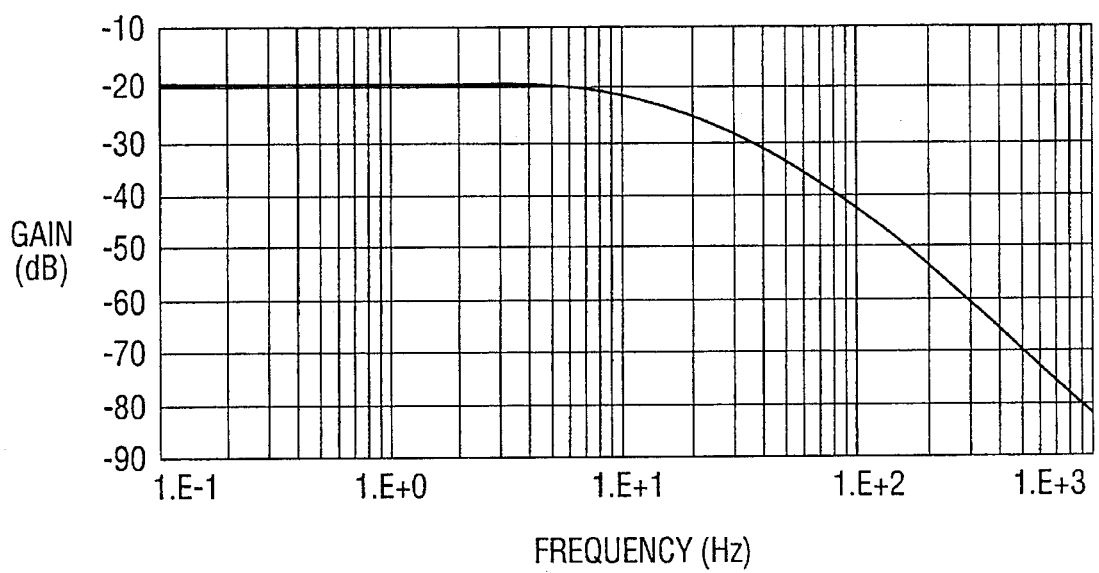
FIG. 5 is a disturbance suppression characteristic diagram of the tension control apparatus in the second embodiment of the invention.

In such a configuration, damping is effected in the system with the feedback system, and hence convergence is obtained against the errors of the feed-forward system, and disturbances and tension fluctuations can be suppressed. Furthermore, the resonance due to mutual interference of the two reels 2, 8 which are coupled via the tape 1 can be simultaneously suppressed. FIG. 4 shows an example of disturbance suppression characteristic which is a transmission characteristic from the torque disturbance of the supply reel to the tension in the first embodiment. FIG. 5 shows an example of disturbance suppression characteristic which is the transmission characteristic from the torque disturbance of the supply reel to the tension in the second embodiment. Thus, the resonance existing in FIG. 4 can be suppressed by adding a feedback system using the pressure sensor 30, so that the stability can be enhanced. However, the resonance present in FIG. 4 is a mechanical resonance, and it is not actually so unstable as shown in the drawing, and the feedback system may not be required unless a tension control of high precision is required in the apparatus.

The output signal of the pressure sensor 30, the differentiated signal of the output signal of the pressure sensor 30, and the output of the torque modulator 16 are summed up at a determined gain, and the sum is delivered to the first driving circuit 17, so that the tension fluctuation may be further suppressed.

Figure 6:
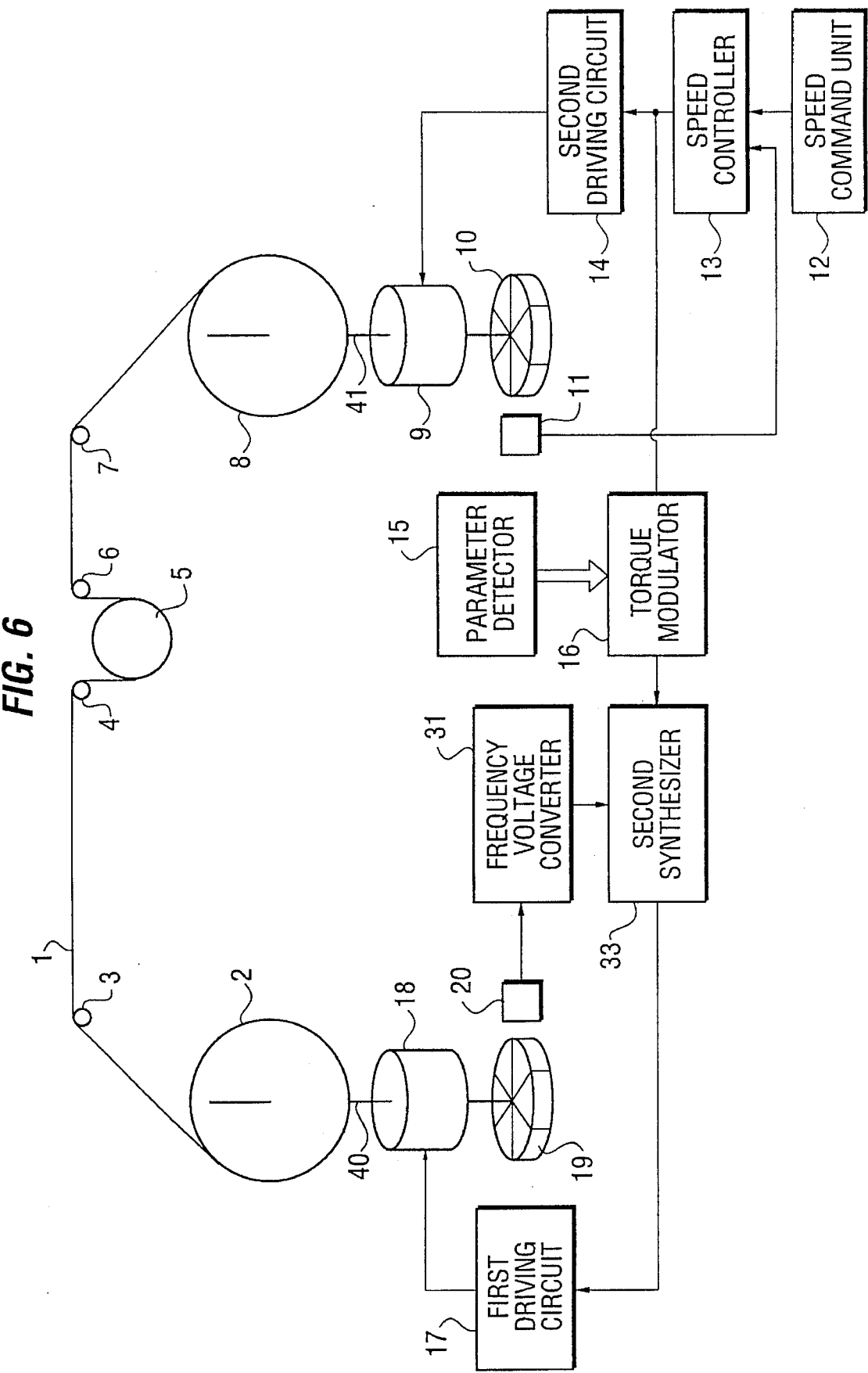
FIG. 6 is a structural diagram of the tension control apparatus in a third embodiment of the invention.

A third embodiment is shown in FIG. 6. The constituent elements which are the same as in the first and second embodiments are identified with the same reference numbers. In the second embodiment, in order to guarantee stability of the control system, when feeding back the detection signal of the tension by the pressure sensor 30 to the first motor 18, its differential value is used. The feedback by adding the differential value of the feedback signal for stabilization of the control system is an effective means not limited to such tension control device. However, considering an actual circuit system, It is difficult to realize stable differential processing in the high frequency region due to the noise component contained in the signal to be differentiated. Therefore, in the case of broadening the band of the tension control system, it is a bottleneck and it is difficult to stabilize the tension control system sufficiently. The third embodiment of the invention relates to an improvement of this point, and is intended to propose a tension control device capable of composing a broader band tension control system without sacrificing the stability.

The third embodiment of the invention will be explained with reference to FIG. 6. On the rotary shaft 40 of the first motor 18, a magnetic flux detecting element 20 is disposed opposite a magnet 19 magnetized on multiple poles, and a pulse at a frequency proportional to the rotating speed of the first motor 18 is generated. It is converted into a voltage signal proportional to the rotating speed of the supply reel 2 by a frequency voltage converter 32, and is fed into a second synthesizer 33. The second synthesizer 33 adds the change of the rotating speed of the supply reel 2 depending on the voltage signal of the frequency voltage converter 32 to the output of the torque modulator 16 at a gain determined in the direction of suppressing It, and determines the torque command value of the first driving circuit 17.

In such configuration, the control system has a damping and is enhanced in stability. In the second embodiment of the invention, by differentiating the signal proportional to the tension, the control system is stabilized. However, as mentioned above, it is forced to have the restriction due to effects of the noise components contained when broadening the tension control band. In the tension control apparatus of the invention, accordingly, without differentiating, the rotating speed of the first motor 18 for directly driving the supply reel 2 is detected and fed back, so that broadening of the band of the tension control system is easier. Furthermore, it is also possible to have a configuration without using the tension detector.

When the third embodiment is further combined with a pressure sensor 30 for detecting the tension as in the second embodiment, and by summing the output of the pressure sensor 30 and the output of the frequency voltage converter 32 and the output of the torque modulator 16 at a proper gain, tension control of high precision is possible. In this case, too, since the tension detection signal is not differentiated, when obtaining the tension control system in the same band as in the tension control apparatus in the second embodiment, the restrictions with respect to configuration of the tension detection mechanism can be largely alleviated.

Figure 7:
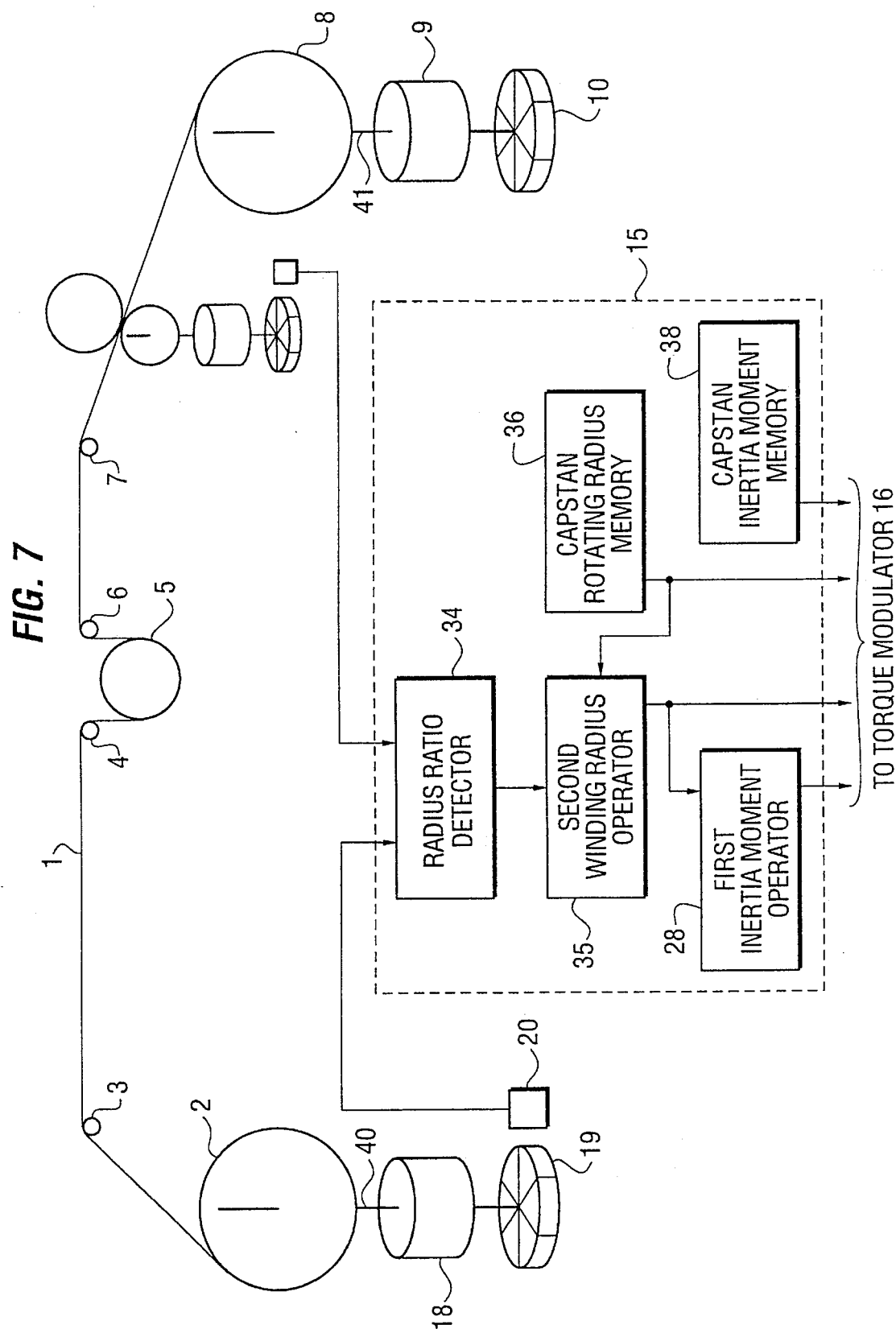
FIG. 7 is a structural diagram of a parameter detector in an embodiment in which the tape running means of the invention is composed of a capstan and pinch roller.

The first, second and third embodiments of the invention relate to the use of the takeup reel 8 as the tape transfer means. When the capstan and pinch roller are used as the tape transfer means, the parameter detector 15 is composed as follows. FIG. 7 shows the constitution of an embodiment of the parameter detector 15 in which the capstan is used. The moment of inertia of the capstan and the radius of the rotary shaft of the capstan are fixed values, and they are measured preliminarily and stored in a capstan inertia moment memory 38, and a capstan rotating radius memory 36. Since the moment of inertia and winding radius of the supply reel 2 about the rotary shaft 40 of the first motor 18 vary from moment to moment, It is necessary to determine the values on the respective moments. As explained in relation to the winding area sum detector 24 in the first embodiment, a pulse generating circuit for generating the pulse at the frequency proportional to the rotating speed of the capstan and supply reel 2 is provided. It is supposed herein that pulses Zc, Z are generated during one revolution of the capstan and supply reel 2. As explained in the first embodiment, from the output pulses of two pulse generating circuits, the ratio Ms of the pulses of the capstan and supply reel 2 is detected by the radius ratio detector 34. The winding radius rs of the supply reel 2 is obtained, the same as in equation (8), as follows:

$$rs = \frac{Z}{Zc} \cdot rc \cdot Mt \tag{18}$$

That is, from the outputs of the radius ratio detector 34 and capstan rotating radius memory 36, the operation of equation (18) is performed in the second winding radius operator 35, The moment of inertia of the supply reel 2 is determined similarly in equation (17) in the first inertia moment operator 28 as shown in the first embodiment. Thus, the values of the first inertia moment operator 28, second winding radius operator 35, capstan inertia moment memory 38, and capstan rotating radius memory 36 are delivered to the torque modulator 16. Other configurations of the parameter detector 15 may be composed in the same way as in the first, second and third embodiments, In the above embodiments, a pressure sensor 31 is used as the tension detector. However, a tension sensor which is composed of a moving post and a spring may be used to detect the tension of the tape. This tension sensor detects the tension by a position at which the force pressing the post is equal to the spring force.

What is claimed is:

1. A tension control apparatus comprising:

a first reel on which a tape is wound;

a first motor having a first rotary shaft coupled to the first reel for directly driving the first reel;

a second reel for drawing out the tape from the first reel and running the tape at a specific speed;

a second motor having a second rotary shaft coupled to the second reel for directly driving the second reel;

a first driving circuit for generating a torque in the first motor proportional to an input signal;

a speed controller for generating, according to an input speed command, a first torque command signal indicative of a predetermined first torque Tt;

a second driving circuit, receiving the first torque command signal, for generating a torque in the second motor proportional to the first torque command signal;

a parameter detector for detecting and determining a moment of inertia Js of the first reel about the first rotary shaft of the first motor, a winding radius r, of the tape wound on the first reel, a moment of inertia Jt of the second reel about the second rotary shaft of the second motor, and a winding radius r of the tape wound on the second reel; and a torque modulator, receiving the first torque command signal and an output from the parameter detector, for modulating the torque command signal according to the output of the parameter detector to obtain a second torque command signal indicative of a second torque Ts and for applying the second torque command signal as the input signal to the first driving circuit, wherein $$Ts = (((Js \cdot r)/(Jt \cdot r)) \cdot (Tt - Ft \cdot r)) - Fs \cdot r$$

where Fs is a tension of the tape on the first reel and Ft is a tension of the tape on the second reel.

* * * * *